No. 782,340.

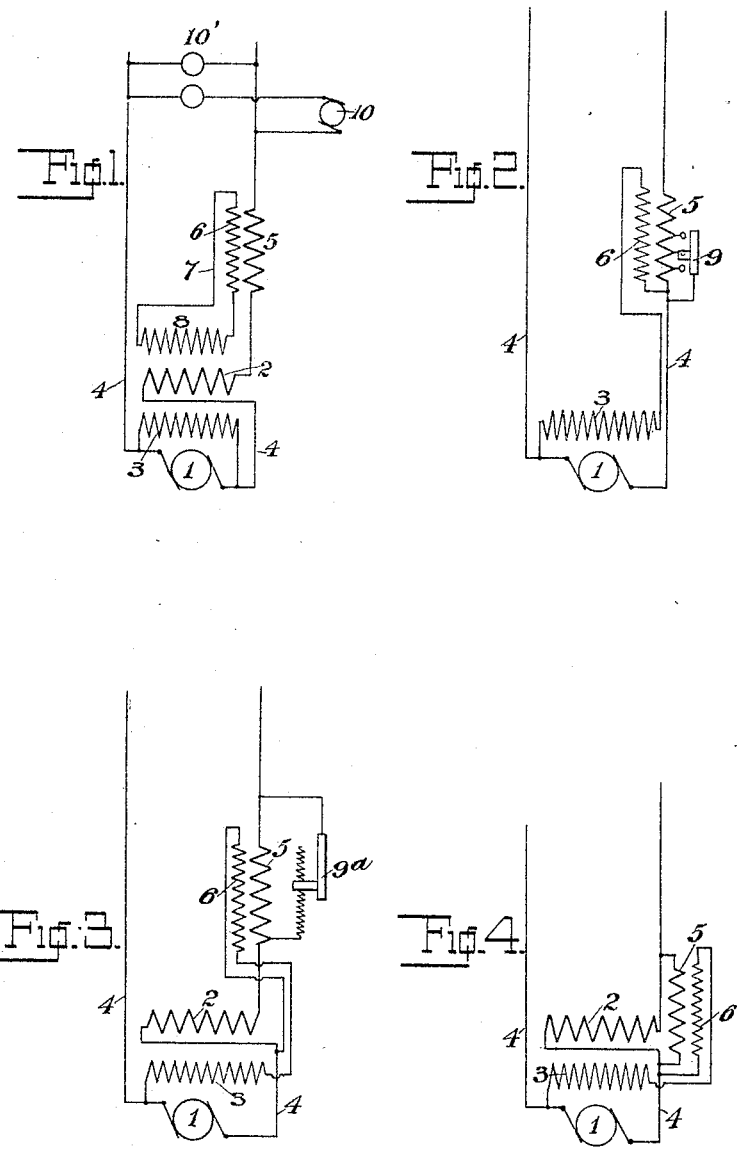

Patented February 14, 1905.

UNITED STATES PATENT OFFICE.

ALBERT S. HUBBARD, OF GREENWICH, CONNECTICUT.

MEANS FOR REGULATION OF DYNAMO-ELECTRIC MACHINES.

SPECIFICATION forming part of Letters Patent No. 782,340, dated February 14, 1905.

Application filed February 20, 1902. Serial No. 94,914.

*To all whom it may concern:*

Be it known that I, ALBERT S. HUBBARD, a citizen of the United States, residing at Greenwich, in the county of Fairfield and State of Connecticut, have invented certain new and useful Improvements in Means for Regulation of Dynamo-Electric Machines, of which the following is a specification.

This invention relates to improvements in means for regulation of dynamo-electric machines, and is applicable in connection with either generators or motors.

Shunt-wound or compound-wound dynamos and motors are more or less self-regulating as to maintenance of constant conditions of electromotive force or of speed, as the case may be, under varying loads; but in the case of circuits liable to sudden variations of load on account of connection with elevator, street-railway, or other motors the voltage of the dynamo is liable to dip or the speed of a motor to slacken momentarily on sudden application of an abnormal load to the circuit, this momentary dip or slackening being due mainly to the sluggishness or self-induction of the field-magnet. The same momentary dip or lack of response may be due to the momentary slowing down of the driving-engine, due to sluggishness of the governor. My present invention is intended to prevent such momentary variation in voltage of the dynamo or speed of the motor, and the invention comprises an inductive device responding to sudden changes in the dynamo or motor circuit and influencing the field-magnet to overcome the corresponding sudden change in the voltage or speed. Said device preferably consists of a transformer having its primary included in the main circuit—that is, in circuit with the armature of the dynamo or motor—while the secondary is connected in series with the shunt field-coil or with a separate field-coil.

In the accompanying drawings, Figure 1 is a diagram showing one embodiment of my invention, the secondary coil of the transformer being connected with a special field-coil of the dynamo or motor. Figs. 2, 3, and 4 are similar views showing other ways of connecting the induction devices according to my invention.

Referring to Fig. 1, the armature 1 of the dynamo-electric machine, generator, or motor is connected through the series field-coil 2 with the circuit-leads 4, the shunt field-coil 3 being connected across said leads. The transformer or induction device has its primary coil 5 included in one side of the main circuit 4, while the secondary coil of said transformer is connected in a circuit 7, including a special or separate field-coil 8, which is wound on the same cores as the usual series and shunt coils. I have indicated at 10 a variable load, such as a motor, and at 10' an equable load, such as electric lights. Under conditions of constant load this transformer and the supplementary field-coil 8 are idle and without effect on the generator or motor; but in case of any sudden change in the load the transformer will respond and will send a current through the supplementary field-coil that will tend to overcome momentarily the disturbing effect of this change on the circuit until the dynamo or motor has time to catch up or adjust itself to the new conditions. Thus in the case of a sudden increase of load on the circuit of a dynamo the effect of the corresponding increase of current in the main circuit will be to induce, through the transformer, a current in local circuit 7 in a direction to supplement the effect of the main magnetizing field-coils and tend to hold up the voltage generated by the dynamo and prevent any sudden drop. By this means the effect of any sudden variation in the power-load 10 is prevented from causing a momentary drop in potential, and the lights 10' are maintained at a steady illumination. When the main circuit ceases to increase, the inducing action will cease; but by that time the main series coil of the dynamo will have responded to the increase of current therein to maintain the proper condition of voltage, the object of the present invention being only to provide for the lack of instantaneousness of the ordinary regulating means due to sluggishness either of the dynamo field-magnet or of the engine-governor. On a decrease of the main current a reverse action occurs, tending to prevent a momentary rise of potential. In case of a motor the effect of a fall in potential on the main or supply circuit resulting, say, from a sudden increase of load at other points, as at motor 10, will be to cause the current through the motor to drop accordingly, and as this current passes through the primary of the transformer there will be induced in the secondary thereof a current that will traverse the supplementary field-coil 6 and will temporarily diminish the excitation of the motor-field magnet until the change in potential ceases, by which time the main coil of the motor-field magnet will have had time to respond and by giving a relatively weaker field allow the motor to hold up to normal speed under the lower electromotive force. Similarly for increase of electromotive force the motor-field is strengthened momentarily by induction and then permanently by direct action of its series field.

Instead of providing a separate field-coil for giving this temporary excitation I may utilize the usual shunt field-coil of the dynamo for this purpose. Thus in Fig. 2 the secondary of the transformer is connected in series with the field-coil 3 of a shunt-wound dynamo, while the primary is connected directly in the main circuit. The transformer, as before, is without electromotive influence on the circuit until there is a change in current, when it causes by induction a temporary current to flow through the shunt field-coil, which tends to prevent any sudden change of voltage in the dynamo. In case of a compound-wound dynamo the secondary of the transformer would be included in circuit with the shunt field-coil, while the primary would be in the main circuit either in series with the series field-coil, as shown in Fig. 3, or in shunt with said series coil, as in Fig. 4, being in either case responsive to changes in the main circuit. Of course it is evident that the effect of the transformer can be regulated in any of the well-known ways—for instance, varying the distance between the primary and secondary coils, varying the number of turns in the primary, or varying the number of turns in the secondary, or by means of shunts to the primary, or by means of opposing coils in the secondary. Thus in Fig. 2 I have shown a switch 9 for cutting out portions of the primary and in Fig. 3 an adjustable rheostatic switch 9ª for shunting the primary.

In designing this system for use to aid the regulation of the dynamo the secondary primary should be so calculated as to compensate for the drop in voltage caused by the sluggishness of the iron and the momentary slowing up of the engine upon application of load, also for the momentary distortion of field consequently produced.

My invention is also applicable to systems of distribution comprising a storage battery and booster, and the same is shown and described in my application for Letters Patent, Serial No. 166,582, filed July 22, 1903.

Having thus described my invention, the following is what I claim as new therein and desire to secure by Letters Patent:

1. The combination with a dynamo-electric machine, the field of which is responsive to electrical changes in its external circuit, of induction means responsive only to variations in load in said circuit and influencing the field of said machine to stimulate or quicken its responsive action.

2. The combination with a dynamo-electric machine having a self-regulating field-winding and a work-circuit connected with said dynamo, of an induction device having primary and secondary members responsive to a state of change in electrical conditions in the said work-circuit to control the dynamo-electric machine during such state of change in such manner as to temporarily counteract the effect of such changing condition on the dynamo-electric machine.

3. The combination with a dynamo-electric machine having a self-regulating field-winding and a work-circuit connected with said dynamo, of an induction device having primary and secondary members connected to a field-magnet coil of said dynamo-electric machine and responsive to a condition of changing current in said circuit to control the excitation of the field-magnet of the dynamo-electric machine so as to temporarily counteract the effect of such changing condition on the electromotive force of the dynamo.

4. The combination with a dynamo-electric machine having a self-exciting field-winding responsive to electrical conditions in its external circuit, of an induction device responsive to changes in the external circuit of said machine, said induction device connected with a field-winding of said machine and individually influencing said field to stimulate or quicken the responsive action thereof.

5. The combination with a dynamo-electric machine having a self-exciting field-winding responsive to electrical conditions in the external circuit, said field-winding comprising a shunt-coil, of an induction device responsive only to variations in load in the external circuit and connected with the shunt field-coil of the dynamo-electric machine to stimulate its action.

6. The combination with a dynamo-electric machine having a self-regulating field-winding responsive to electrical conditions in its external circuit, of a transformer having its primary connected with said circuit and responsive only to variations in load therein and its secondary connected to a field-winding of said machine to stimulate or quicken the responsive action thereof.

7. The combination with a dynamo-electric machine having a shunt field-winding, of a transformer having its primary connected in the external circuit of said machine responsive only to variations in load therein, and having its secondary connected with the said shunt field-winding to stimulate the responsive action thereof.

8. The combination with a dynamo-electric machine, having a compound field-winding and means to stimulate or quicken the responsive action of said field, said means comprising a transformer having its primary in the external circuit of said machine and responsive only to variations in load therein and its secondary connected with the shunt-winding of said machine.

9. The combination with a dynamo-electric machine having its field responsive to electrical changes in the external circuit, of additional means to influence the responsive action of said field, said additional means comprising a transformer having its primary connected with said circuit and its secondary connected with the field-winding of the dynamo-electric machine, and means for regulating the effect of said transformer.

10. The combination with a dynamo-electric machine having its field responsive to electrical changes in the external circuit, of a transformer having its primary connected with said circuit and its secondary connected with the field-winding of said machine and means for regulating the effect of said transformer consisting of a switch for cutting in or out portions of one of its coils.

ALBERT S. HUBBARD.

Witnesses:
 ARTHUR P. KNIGHT,
 J. GREEN.